(12) United States Patent
Techer et al.

(10) Patent No.: US 10,603,850 B2
(45) Date of Patent: Mar. 31, 2020

(54) PROCESS FOR MOLDING A THERMOSETTING RESIN

(71) Applicant: SAFRAN AIRCRAFT ENGINES, Paris (FR)

(72) Inventors: Marc-Emmanuel Techer, Moissy-cramayel (FR); Raoul Jaussaud, Moissy-cramayel (FR)

(73) Assignee: Safran Aircraft Engines, Paris (FR)

( * ) Notice: Subject to any disclaimer, the term of this patent is extended or adjusted under 35 U.S.C. 154(b) by 95 days.

(21) Appl. No.: 15/515,420

(22) PCT Filed: Sep. 30, 2015

(86) PCT No.: PCT/FR2015/052609
§ 371 (c)(1),
(2) Date: Mar. 29, 2017

(87) PCT Pub. No.: WO2016/051082
PCT Pub. Date: Apr. 7, 2016

(65) Prior Publication Data
US 2017/0232690 A1    Aug. 17, 2017

(30) Foreign Application Priority Data

Sep. 30, 2014 (FR) ..................... 14 59231

(51) Int. Cl.
*B29C 70/48* (2006.01)
*B29C 45/77* (2006.01)
(Continued)

(52) U.S. Cl.
CPC .......... *B29C 70/48* (2013.01); *B29C 35/0288* (2013.01); *B29C 45/0001* (2013.01);
(Continued)

(58) Field of Classification Search
CPC ......... B29C 70/48; B29C 70/34; B29C 70/00; B29C 35/0288; B29C 45/00; B29C 45/77; B29C 45/78
See application file for complete search history.

(56) References Cited

U.S. PATENT DOCUMENTS 4,208,176 A      6/1980  Salerno
4,359,435 A  *  11/1982  Kogure ............... B29C 33/3857
                                                      264/17
(Continued)

FOREIGN PATENT DOCUMENTS

CN         1829757 A      9/2006
CN       101837617 A      9/2010
(Continued)

OTHER PUBLICATIONS

R.J.C. Carbas, L.F.M. da Silva, E.A.S. Marques & A.M. Lopes "Effect of post-cure on the glass transition temperature and mechanical properties of epoxy adhesives" Journal of Adhesion Science and Technology, http://dx.doi.org/10.1080/01694243.2013.790294, Apr. 22, 2013, downloaded Dec. 3, 2018 (Year: 2013).*
(Continued)

*Primary Examiner* — Peter L Vajda
*Assistant Examiner* — S. Behrooz Ghorishi
(74) *Attorney, Agent, or Firm* — Bookoff McAndrews, PLLC

(57) ABSTRACT

A method of molding a thermosetting resin, in particular of the epoxy resin type, in which a first mold is filled with the resin while causing the temperature of the resin to vary in application of a first temperature program, without exceeding the Tg of the resin. After the first mold has been filled, the resin is put under pressure while causing the temperature of the resin to vary in application of a second temperature program, without exceeding Tg, and a drop in the pressure exerted by the resin on the mold is detected with the instant
(Continued)

at which this pressure presents a break of slope being identified as the instant t1. A second mold is filled with the thermosetting resin in application of the first temperature program. After the second mold has been filled, the resin is put under pressure in application of the second temperature program until an instant t2 close to t1. As from t2, the temperature of the resin is increased to exceed Tg.

12 Claims, 2 Drawing Sheets

(51) Int. Cl.
*B29C 45/78* (2006.01)
*B29C 35/02* (2006.01)
*B29C 45/00* (2006.01)
*B29K 21/00* (2006.01)
*B29K 63/00* (2006.01)
*B29C 45/02* (2006.01)

(52) U.S. Cl.
CPC .............. *B29C 45/77* (2013.01); *B29C 45/78* (2013.01); *B29C 2045/028* (2013.01); *B29C 2945/7601* (2013.01); *B29C 2945/7626* (2013.01); *B29C 2945/76257* (2013.01); *B29C 2945/76414* (2013.01); *B29C 2945/76531* (2013.01); *B29C 2945/76892* (2013.01); *B29K 2021/006* (2013.01); *B29K 2063/00* (2013.01)

(56) References Cited

U.S. PATENT DOCUMENTS

2003/0091735 A1* 5/2003 Baumann ............... H02K 15/12
427/180
2016/0257779 A1* 9/2016 Cruce ....................... C08F 4/80

FOREIGN PATENT DOCUMENTS

| EP | 0 068 512 A2 | 1/1983 |
| EP | 1207031 A1 | 5/2002 |
| JP | S6398406 A | 4/1988 |
| JP | H0725094 B2 | 3/1995 |
| JP | 2001030279 A | 2/2001 |
| JP | 2005068417 A | 3/2005 |
| JP | 2008114393 A | 5/2008 |
| RU | 1831427 A3 | 7/1993 |
| SU | 939261 A1 | 6/1982 |
| WO | 2013/068666 A1 | 5/2013 |

OTHER PUBLICATIONS

International Search Report issued in corresponding International Application No. PCT/FR2015/052609, dated Jan. 15, 2016 (4 pages—including English translation).
Office Action for corresponding Chinese Application No. 2015800529982, dated Sep. 29, 2018 (9 pages).
Office Action for corresponding Japanese Application No. 2017-517252, dated Aug. 6, 2019 (6 pages).

* cited by examiner

PROCESS FOR MOLDING A THERMOSETTING RESIN

CROSS-REFERENCE TO RELATED APPLICATIONS

This application is the U.S. national phase entry under 35 U.S.C. § 371 of International Application No. PCT/FR2015/052609, filed on Sep. 30, 2015, which claims priority to French Patent Application No. 1459231, filed on Sep. 30, 2014, the entireties of which are herein incorporated by reference.

TECHNICAL FIELD

The present description relates to a method of molding a thermosetting resin.

Such a method may be used in fabricating composite parts, and in particular for fabricating composite parts by resin transfer molding (RTM).

BACKGROUND

The resin transfer molding (RTM) method is a known method that is used for making parts out of (fiber-resin) composite materials having a high strength to weight ratio. In conventional manner, the RTM method comprises the following operations:
preparing a fiber preform by weaving fibers;
placing the fiber preform in an injection mold;
injecting resin in the liquid state into the mold in order to fill it and impregnate the fiber preform; and
applying pressure to the injected resin and polymerizing the resin by heating.

Such a method is known, e.g. from document EP 0 068 512.

After unmolding, a composite part is obtained that comprises a fiber reinforcing structure embedded in a matrix of polymerized resin. The outside shape of the part corresponds to the shape taken by the resin in the cavity of the mold.

The resins used are very fluid so as to penetrate well between the various fibers of the preform, even when injected under low pressure. During polymerization, under the effect of heat, the injected resin passes successively from the liquid state to the gelled state to the solid state.

In order to avoid or limit defects and pores in the part, associated with the phenomenon of the resin giving off gas during polymerization, it is known to maintain the resin under pressure until the part has polymerized completely. For this purpose, it is possible to use a pressurizing device such as for example the device described in patent Document WO 2013/068666 A1. Although that solution is satisfactory for defects and pores of medium size, it can be found difficult to perform for defects and pores of small size (e.g. of size smaller than 5 millimeters (mm)). Specifically, under such circumstances, the level of pressure required for the resin often exceeds the capacity of devices in common use, which makes it necessary to use other devices that are more expensive and to adapt existing installations to those new devices.

There therefore exists a need for a new solution.

GENERAL SUMMARY

The present description relates to a method of molding a thermosetting resin, e.g. a PR520 epoxy resin type of resin.

In a first stage of this method, the following operations may be performed:
filling a first mold with a thermosetting resin while causing the temperature of the resin to vary in compliance with a first temperature program, without exceeding a glass transition temperature, written "Tg", of the resin; and
after the first mold has been filled, putting the resin under pressure while causing the temperature of the resin to vary in compliance with a second temperature program, without exceeding the Tg of the resin, and detecting a drop in the pressure exerted by the resin on the mold by identifying the instant t1 when the pressure presents a break of slope.

In a second stage of the method, it is possible to perform the fowling operations:
filling a second mold, analogous to the first mold, with the thermosetting resin, while causing the temperature of the resin to vary in compliance with the first temperature program; and
after the second mold has been filled, putting the resin under pressure while causing the temperature of the resin to vary in compliance with the second temperature program up to an instant t2 substantially equal to t1, and then from the instant t2, increasing the temperature of the resin so as to exceed the Tg of the resin.

The purpose of the first stage of the method is to identify the instant t1. The inventors suppose that the pressure drop observed at this instant corresponds to a certain degree of advance in the reaction of polymerizing the resin. They suppose that from this degree of advance, the resin contracts and thus exerts less pressure on the mold. The pressure exerted by the resin on the mold can be measured using one or more pressure sensors present on the wall of the cavity of the mold.

The second stage of the method consists in reproducing the molding conditions of the first stage up to the instant t2, which is close to t1, and then from t2, in increasing the temperature of the resin in excess of its Tg in order to put the resin under greater pressure. For example, the instant t2 lies in the time interval [t1−10 minutes (min), t1+10 min] or in the time interval [t1−(t1−t0)/2, t1+(t1−t0)/2].

Specifically, in their research, the inventors have observed that the fact of heating the resin to above its Tg, once the resin has reached a certain degree of polymerization (identified by the instant t1, or the time interval around t1), makes it possible to obtain a significant increase in the pressure (referred to below as the "pressure peak") that is exerted by the resin on the mold. The inventors suppose that this pressure peak is associated with the large increase in the coefficient of thermal expansion of the resin when the resin goes above its Tg, with this increase being accompanied by a large increase in the volume of the resin as its temperature increases. Since the mold withstands this increase in volume, the pressure to which the resin is subjected then becomes large.

The "pressure peak" triggered during the second stage of the method makes it possible to increase the pressure to which the resin is subjected, and thus to avoid or limit the formation of defects and pores while the resin is polymerizing. This polymerizing of the resin thus takes place inside the mold, thus making it possible to obtain a uniform distribution of pressure in the part (i.e. pressure is substantially uniform at all points in the part) and to avoid the head losses that are to be encountered with conventional devices for applying pressure. The pressure peak also makes it possible to reach high pressures without needing special equipment. The proposed method thus makes it possible to avoid or limit defects and pores of small size in the molded part, without needing to change conventional installations and molding equipment.

In the present description, the term "Tg" is used to designate the glass transition temperature as measured using the differential scanning calorimetry measurement method according to the ASTM E1356 standard.

The second stage of the method consists initially in reproducing the molding conditions of the first stage. That is why the second mold is advantageously selected to be analogous or identical to the first mold. In particular, the first and second molds may be the same mold. Under such circumstances, the first mold is emptied at the end of the first stage of the method in order to be ready for reuse in the second stage. For the same reasons, if it is decided to mold the resin on a reinforcing structure arranged in the first mold during the first stage of the method, an analogous or identical reinforcing structure is placed in the second mold for the second stage of the method.

In addition to the above-mentioned characteristics, the proposed method can present one or more of the following characteristics, considered in isolation or in any technically feasible combination:
- the second temperature program is an isothermal program;
- in the second temperature program, the temperature of the resin is held at a value lying in the temperature range [Tg–20° C., Tg–10° C.];
- at the instant t2, the rate at which the temperature of the resin increases lies in the range 0.56° C./min to 3.3° C./min (in the range 1° F./min to 6° F./min), preferably in the range 1.6° C./min to 3.3° C./min (in the range 3° F./min to 6° F./min);
- the thermosetting resin is an epoxy resin, and in particular of PR520 type;
- the method is used for fabricating composite parts by resin transfer molding;
- the duration t1–t0 lies in the range 1 min to 2 hours (h), in particular in the range 5 min to 60 min, in particular in the range 10 min to 50 min, specifically in the range 20 min to 40 min, more particularly in the range 25 min to 35 min, and may in particular be about 30 min.

The present description also provides a method of molding a thermosetting resin of the epoxy resin type, comprising:
- filling a mold with the thermosetting resin, while causing the temperature of the resin to vary in application of a first temperature program, without exceeding a Tg of the resin;
- after the mold has been filled, raising the temperature of the resin so as to exceed the Tg of the resin; and
- after filling the mold and before increasing the temperature of the resin, putting the resin under pressure while causing the temperature of the resin to vary in compliance with a second temperature program without exceeding the Tg of the resin and for a predetermined duration.

The predetermined duration may be predetermined by a method similar to the first stage of the above-described method; under such circumstances, the predetermined duration is substantially equal to the duration between the end of filling the mold and the instant t1 of the pressure drop. Nevertheless, while determining the predetermined duration, it is possible to increase the temperature above the Tg of the resin after filling the mold without waiting for the pressure drop instant. Specifically, whether or not the Tg is exceeded after filling and before the pressure drop instant t1 has no consequence, given the low degree of polymerization prior to the instant t1. Consequently, the pressure drop instant t1 remains identical regardless of the temperature program applied between the end of filling the mold and the instant t1.

Other characteristics and advantages of the method appear on reading the following detailed description of an implementation of the proposed method.

BRIEF DESCRIPTION OF THE DRAWINGS

The method and its advantages can be better understood on reading the following detailed description of implementations of the invention given as non-limiting examples. The description refers to the accompanying drawings, in which.

DETAILED DESCRIPTION OF IMPLEMENTATION(S)

An implementation is described in detail below with reference to FIGS. 1 and 2. This implementation shows the characteristics and the advantages of the invention. Nevertheless, it should be recalled that the invention is not limited to this implementation.

In this implementation, the thermosetting resin may be an epoxy resin having a Tg lower than its curing temperature. In an example, the resin may have at least one of the following properties: be a resin of class 180° C., have improved toughness, have a Tg equal to about 155° C. In the implementation that is described in detail below, the resin used is of the PR 520 type, and it possesses these three properties.

Figure 1:
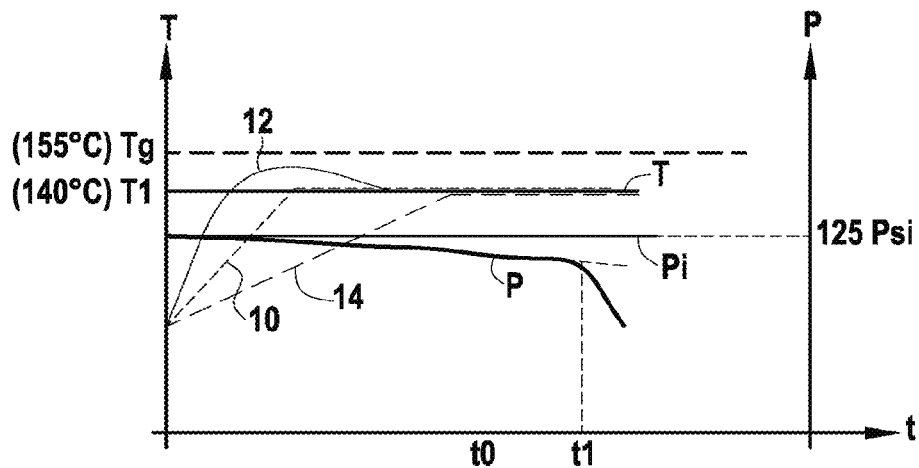
FIG. 1 shows how temperature and pressure vary during the first stage of the molding method in an implementation of the invention.

In a first stage of the method, as shown in FIG. 1, the mold is filled with the epoxy resin. During filling, the temperature of the resin is caused to vary in compliance with a first temperature program, without exceeding the Tg of the resin. In an example, FIG. 1 shows the first temperature program as being an isothermal program (i.e. at constant temperature). In general manner, in order to heat the resin, heater elements are used of the kind known to the person skilled in the art. Nevertheless, the first temperature program may be a non-isothermal program, e.g. one of the programs 10, 12, and 14 shown in FIG. 1. The program 10 comprises a uniform temperature rise followed by a hold. The program 12 comprises a temperature rise, in this example to above the temperature T1, followed by a temperature drop, in this example a small drop down to the temperature T1. The program 14 comprises a uniform temperature rise up to the temperature T1. As mentioned above, for each of these other examples of programs 10, 12, 14, the temperature remains lower than Tg.

In order to fill the mold, it is possible to use an injector of the type commonly used in RTM methods, and for example an injector making it possible to apply an injection pressure Pi of 0.86 megapascals (MPa) (i.e. 125 pounds per square inch (psi)) on the resin in order to cause it to penetrate into the mold.

At the end of this first step of the first stage of the method, the mold is full of epoxy resin, this resin being at a temperature T1 of about 140° C. (less than the Tg temperature of the resin, which is equal to 155° C. in this example). An instant t0 corresponding to the end of said first step is identified. At this instant t0, the degree of polymerization of the resin may lie in the range 20% to 30%, approximately. The second step of the first stage of the method then begins. The injector is not stopped between the first and second steps, so it does not cease to urge the resin into the mold, thus enabling the resin to be put under pressure (in this example, the pressure exerted on the resin by the injector is 0.86 MPa). In turn, the resin exerts a certain pressure on the mold. This pressure P is different from the pressure exerted by the injector because of the increase in the volume of the resin inside the mold, and possibly because of head losses between the injector and the mold. The pressure P exerted by the resin on the mold is measured using one or more sensors arranged on the inside space of the mold, i.e. on the wall of the cavity. When a plurality of sensors are used, the average of the measurements is taken.

In the second step of the first stage, i.e. starting form t0, the temperature of the resin is caused to vary in application of a second temperature program, without exceeding the Tg of the resin, and a drop in pressure exerted by the resin on the mold is identified at a instant t1 where the pressure P presents a break of slope, in particular a first break of slope. The pressure drop is due in particular to the resin shrinking inside the mold during solidification of the resin (above-explained contraction). At the instant t1, the degree of polymerization of the resin may lie in the range 50% to 60%, approximately.

The second temperature program may be an isothermal program, i.e. a program consisting in maintaining the temperature of the resin at a constant value, in particular lower than Tg, e.g. about 140° C. FIG. 1 shows a second temperature program that is isothermal. Under such circumstances, it can be seen that the pressure exerted by the resin on the mold begins to drop very significantly (break of slope) after about 30 min from the beginning of the second step, and that the pressure reaches a minimum at about 33 min. The instant t1 thus corresponds to 30 min from the beginning of the second step (i.e. 30 minutes after the beginning of the second step), for the resin being used. Alternatively, the instant t1 may be identified as being the instant at which the pressure reaches a minimum.

Nevertheless, when the first temperature program and the second temperature program are both isothermal programs, these two programs need not necessarily be held at the same temperature.

Furthermore, the second temperature program may also be any non-isothermal program. By way of example, the second temperature program may include a temperature rise without exceeding the glass transition temperature Tg of the resin, followed by holding at a temperature that does not exceed the glass transition temperature Tg of the resin.

The temperature program followed after the instant t1 is of little importance, since the sole purpose of the first stage of the method is to identify the instant t1; which is why the temperature program followed after the instant t1 is shown only partially in FIG. 1. For example, after the instant t1, it is possible to follow a temperature program suitable for causing the resin to polymerize, thus enabling the molded part to be unmolded and the mold to be reused for the second stage of the method.

The second stage of the method is described below with reference to FIG. 2. In a first step of the second stage of the method, a second mold (which could be the first mold, or another mold that is identical or analogous to the first mold) is filled with the same epoxy resin while following the first temperature program. During a second step of the second stage of the method, after filling the second mold, the resin is put under pressure following the second temperature program up to an instant t2 that is substantially equal to t1. Depending on the variant, the instant t2 may lie in the time interval [t1−10 min, t1+10 min] or in the time interval [t1−(t1−t0)/2, t1+(t1−t0)/2]. The second stage thus consists in reproducing the molding conditions of the first stage up to the instant t2.

In this example, the instant t2 lies in the range 20 min (i.e. 30−10) and 40 min (i.e. 30+10) from the start of the second step of the second stage of the method. In particular, t2 is exactly equal to t1. It should be observed that the first step of the first stage of the method and the first step of the second stage of the method have substantially the same durations.

As from the instant t2, in a third step of the second stage of the method, referred to as the "curing" step, the temperature of the resin is raised until exceeding Tg (155° C. for the epoxy resin used). By way of example, during curing, the temperature of the resin may be raised progressively up to 200° C. in 20 min. In this example, the temperature increases over time with a ramp or rate of increase in temperature lying in the range 5° F./min to 6° F./min (i.e. 2.8° C./min to 3.3° C./min). It is then found that there is a strong increase in the pressure exerted by the resin on the mold (or "pressure peak"), which is remarkable by the fact that this pressure greatly exceeds the pressure exerted on the resin by the injector.

Figure 2:
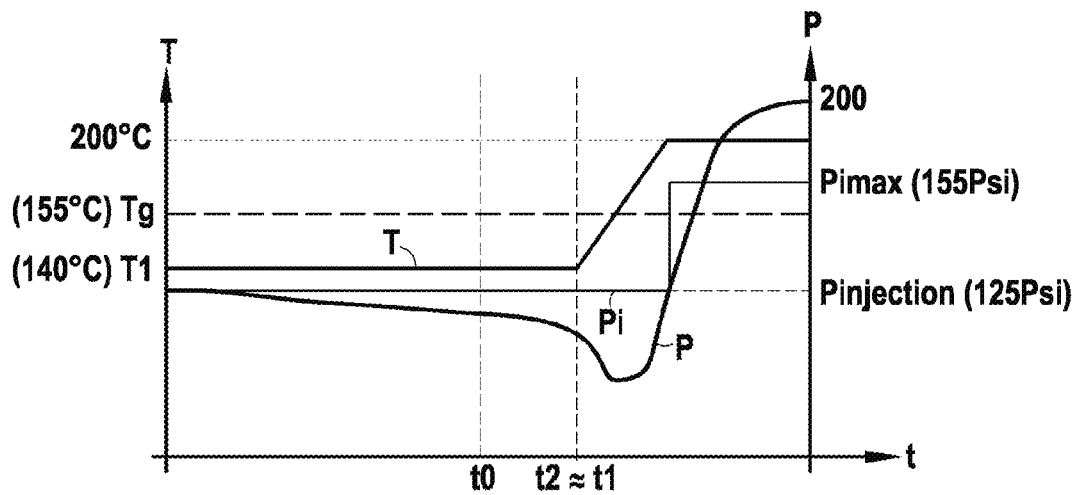
FIG. 2 shows how temperature and pressure vary during the second stage of a molding method in an implementation of the invention.

In order to accompany this increase in pressure, and as shown in FIG. 2, it is possible to increase the pressure Pi exerted by the injector on the resin. For example, it is possible to increase the pressure of the injector to Pimax=155 psi (1.07 MPa) a few minutes after the instant t1, and in particular when the pressure exerted by the resin on the mold reaches 125 psi (0.86 MPa). In this example, it is found that the pressure P exerted by the resin on the mold greatly exceeds the injection pressure, which injection pressure in this example is 155 psi (1.07 MPa): this pressure P reaches 200 psi (1.38 MPa) at the top of the observed pressure peak.

Since the pressure P exerted by the resin on the mold exceeds the pressure delivered by the injector, it is preferable when using a conventional piston injector to close the valve at the inlet of the mold so as to avoid the piston of the injector being pushed back from the moment when the pressure P exerted by the resin begins to exceed the pressure Pi delivered by the injector.

Figure 3:
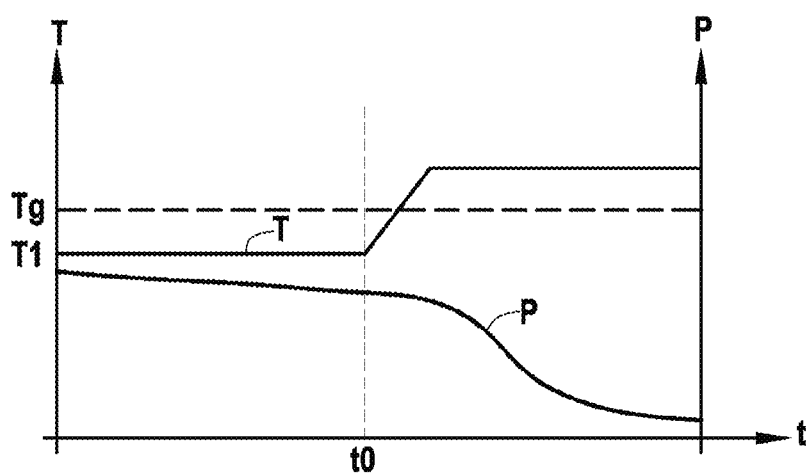
FIG. 3 shows how temperature and pressure vary during a molding method of the prior art.

By way of comparison, FIG. 3 shows a prior art molding method. The temperature curve T is a setpoint temperature curve, while the pressure curve P shows the pressure that is actually exerted by the resin on the mold.

In a first step of the method, the mold is filled up to an instant t0 where the filling of the mold reaches a predetermined level. Thereafter, the temperature is raised to above Tg in order to cure the resin. It is found experimentally that the pressure exerted by the resin on the mold decreases, which can be explained in particular by shrinkage during curing and by the formation of three-dimensional bonds during polymerization.

By comparing FIGS. 2 and 3, it can be seen that the method in the implementation described introduces a delay between the end of the first step and the increase in temperature above Tg. This delay is a duration t2−t0 in this example. The delay corresponds to the time during which the second temperature program (isothermal in this example) is applied. This delay makes it possible to trigger the increase in temperature to above Tg once the resin has reached a degree of polymerization that is sufficient for the increase in the coefficient of thermal expansion of the resin to be significant, thus making it possible to obtain the above-described pressure peak. Conversely, in the prior art as shown in FIG. 3, the increase in temperature is triggered while the degree of polymerization of the resin is still too low, which means that it is not possible to obtain the above-mentioned pressure peak.

The implementation described in the present description is given by way of non-limiting illustration, and, in the light of this description, a person skilled in the art can easily adapt this implementation or envisage others, while remaining within the scope of the invention.

In particular, the means enabling resin to be injected into the mold, the means enabling the resin to be kept under pressure, or the means for heating the resin may be different from those described above.

Furthermore, the term "comprising a" should be understood as being synonymous with "comprising at least one", unless specified to the contrary.

The invention claimed is:

1. A method of molding a thermosetting resin, comprising, during a first stage:
    filling a first mold with a first thermosetting resin while causing the temperature of the first thermosetting resin to vary in compliance with a first temperature program, without exceeding a glass transition temperature Tg of the first thermosetting resin; and
    after the first mold has been filled, putting the first thermosetting resin under pressure while causing the temperature of the first thermosetting resin to vary in compliance with a second temperature program, without exceeding the glass transition temperature Tg of the first thermosetting resin, and detecting a drop in the pressure exerted by the first thermosetting resin on the first mold by identifying an instant t1 when the pressure presents a break of slope over time; and
    in a second stage:
    filling a second mold with a second thermosetting resin that includes a same material as the first thermosetting resin, while causing the temperature of the second thermosetting resin to vary in compliance with the first temperature program; and
    after the second mold has been filled, putting the second thermosetting resin under pressure while causing the temperature of the second thermosetting resin to vary in compliance with the second temperature program up to an instant t2 that lies in a time interval [t1−10 minutes (min), t1+10 min] or in a time interval [t1−(t1−t0)/2, t1+(t1−t0)/2], where t0 is a timing at which the first mold is filled with the first thermosetting resin, and then from the instant t2, increasing the temperature of the second thermosetting resin so as to exceed the glass transition temperature Tg of the second thermosetting resin.

2. A method according to claim 1, wherein the instant t2 lies in the time interval [t1−10 min, t1+10 min].

3. A method according to claim 1, wherein the second temperature program is an isothermal program.

4. A method according to claim 1, wherein, in the second temperature program, the temperature of either the first thermosetting resin or the second thermosetting resin is held at a value lying in the temperature range [Tg−20° C., Tg−10° C.].

5. A method according to claim 1, wherein, at the instant t2, the rate at which the temperature of the second thermosetting resin increases lies in the range 0.56° C./min to 3.3° C./min.

6. A method according to claim 1, wherein the first thermosetting resin and the second thermosetting resin include a same epoxy resin material.

7. A method according to claim 6, wherein the epoxy resin material possesses at least one of the following properties: being a resin of class 180° C., having improved toughness, or having Tg equal to about 155° C.

8. A method according to claim 1, wherein the second mold is analogous or identical to the first mold.

9. A method according to claim 1, wherein the duration t1−t0 is 30 minutes.

10. A method according to claim 1, wherein the second temperature program is an isothermal program that holds the temperature of the second thermosetting resin constant until, when the instant t2 is reached, the temperature of the second thermosetting resin is increased so as to exceed the glass transition temperature Tg of the second thermosetting resin.

11. A method according to claim 1, wherein increasing the temperature of the second thermosetting resin so as to exceed the glass transition temperature Tg of the second thermosetting resin triggers an increase of pressure exerted by the second thermosetting resin on the second mold.

12. A method according to claim 1, wherein increasing the temperature of the second thermosetting resin so as to exceed the glass transition temperature Tg of the second thermosetting resin is performed while the second thermosetting resin is polymerizing.

* * * * *